United States Patent

[11] 3,629,059

[72] Inventors Alberto Agazzi
Ispra, Varese;
Armando Broggi, Induno Olona, Varese; Sergio Galli de Paratesi, Varese; Luciano Ghiurghi, Varese, all of Italy
[21] Appl. No. 793,928
[22] Filed Jan. 21, 1969
[45] Patented Dec. 21, 1971
[73] Assignee European Atomic Energy Community (Euratom)
Brussels, Belgium
[32] Priority Apr. 5, 1968
[33] Belgium
[31] 56807

[54] FLUID CONTROL AND SAFETY RODS FOR NUCLEAR REACTORS
12 Claims, 5 Drawing Figs.
[52] U.S. Cl. .................................................. 176/22, 176/86
[51] Int. Cl. .................................................. G21c 7/02

[50] Field of Search .................................................. 176/22, 86

[56] References Cited
UNITED STATES PATENTS
| | | | |
|---|---|---|---|
| 3,251,746 | 5/1966 | Jeffries et al. | 176/86 X |
| 3,414,476 | 12/1968 | Galli de Paratesi et al. | 176/86 |

FOREIGN PATENTS
| | | | |
|---|---|---|---|
| 1,269,659 | 7/1961 | France | 176/22 |
| 1,125,562 | 3/1962 | Germany | 176/22 |
| 1,084,361 | 9/1967 | Great Britain | 176/22 |

*Primary Examiner*—Benjamin R. Padgett
*Assistant Examiner*—Harvey E. Behrend
*Attorney*—Stevens, Davis, Miller & Mosher

ABSTRACT: A combined safety and control system for a nuclear reactor, comprising tubes passing upwardly through the core of the reactor, a neutron absorbing gaseous atmosphere in the tubes, and means for introducing a liquid neutron poison solution into the tubes in an emergency. The pressure of the gaseous atmosphere is varied to control the power of the reactor.

FLUID CONTROL AND SAFETY RODS FOR NUCLEAR REACTORS

The invention relates to a system of control and safety rods for nuclear reactors.

It is known to control a nuclear reactor by means of hollow tubes passing through its core, in which tubes there is introduced a gaseous mixture containing a neutron absorber whose neutron absorptivity can be changed as required by varying the pressure of the mixture.

It is also known to effect the emergency shut down of a reactor by the rapid introduction into hollow tubes passing through its core of a liquid solution containing neutron poison. Such systems are described in Belgian Pat. No. 678,235 by the applicants and in two applications in the U.S.A. also filed by the applicants under Nos. 768,637 filed Oct. 18, 1968 (liquid safety rods operating by gravity) and 764,413 filed Oct. 2, 1968 (system of liquid safety rods with diaphragm accumulator). An application relating to the same field has also been filed in Italy by CISE on Apr. 26, 1967 and has resulted in Italian Pat. No. 800,930 (means for effecting the shut down of a nuclear reactor by the injection of a neutron-absorbing liquid).

In all these liquid-safety-rod systems, the poison solution remains, until shut down is required, in the hollow tubes that pass through the reactor core with its free surface just below the core.

This invention proposes to fill the space left free in these tubes above the above-mentioned free surface by a gaseous atmosphere of variable pressure containing a neutron poison and acting as a gaseous control rod.

The invention, therefore, in its broad form provides a nuclear reactor having a system of combined safety and control rods comprising tubes passing upwardly through the reactor core, means for providing a neutron absorbing gaseous atmosphere in the tubes at variable pressure to constitute control rods and means for introducing a neutron poison solution into the tubes to constitute safety rods.

More specifically the invention provides a system of fluid safety and control rods in a nuclear reactor, characterized by hollow tubes passing through the core of the reactor from bottom to top and connected to a circuit for the introduction from the bottom of a liquid solution of neutron poison. This circuit, during the normal operation of the reactor, keeps the free level of the solution at a level just below that of the entry of the tubes into the core. In the case of an alarm signal, this circuit rapidly introduces the solution into the core of the reactor, the tops of these tubes being connected to a circuit of a gaseous atmosphere above the liquid solution. At least one of the gaseous components is a neutron absorber, and the gaseous circuit has means for regulating the pressure of this atmosphere to values higher than that of the vapor pressure of the liquid solution. The first mentioned liquid solution introduction circuit has sufficient driving force for emergency introduction at any time of the solution, even against the highest pressure of the gaseous atmosphere.

Some specific embodiments of the invention will now be described by way of example and with reference to the accompanying figures, in which.

Figure 1:
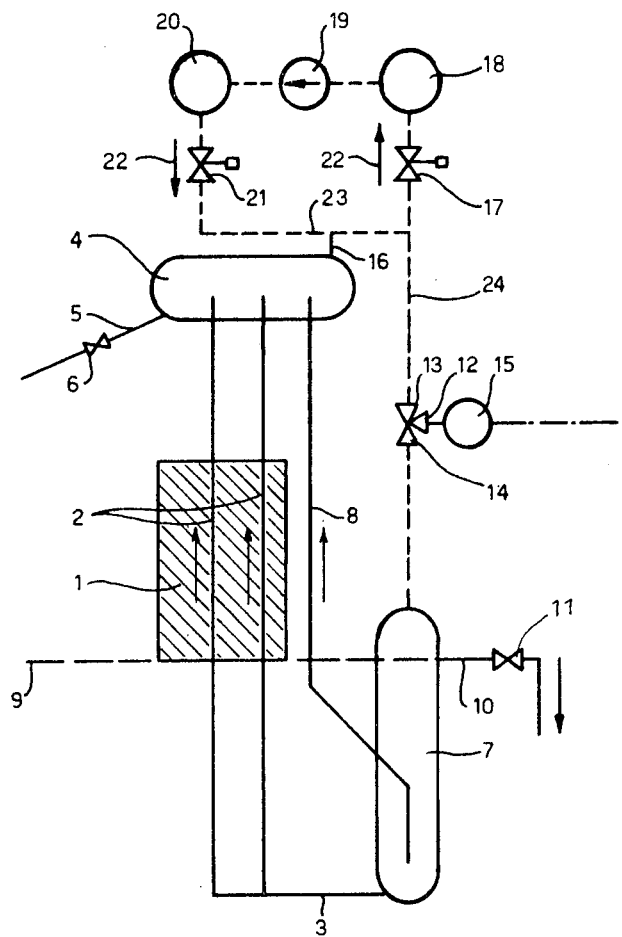
FIG. 1 shows a fluid-rod system according to the present invention in conjunction with a system of liquid rods with an accumulator having a bubbling tube and a penetrating-rod upper collector.

With reference to FIG. 1, the core 1 of the reactor is passed through from bottom to top by hollow tubes 2 coming from a lower collector or header 3 and terminating in an upper collector or header 4 with penetrating rods, provided with a discharge pipe 5 having a leak-proof valve 6. The lower collector 3 is connected to a poison-solution accumulator 7 having a bubbling tube 8 also terminating in upper collector 4. The accumulator 7 is provided at the level 9 just below that of the entry of the tubes 2 into the core 1 with an overflow pipe 10 having a valve 11, and is supplied with pressure driving gas from a reservoir 15 through a three-way valve 12, 13, 14. The tops of the hollow tubes 2 are connected by means of the upper collector 4 and a connection pipe 16 to a gaseous circuit comprising in series a valve 17, a low-pressure reservoir 18, a pump or compressor 19, a high-pressure reservoir 20 and a valve 21. The pump or compressor 19 is for transferring gas from the low-pressure reservoir 18 to the high-pressure reservoir 20. The gas then flows in the direction of the arrows 22. The part 23 of this circuit comprising the connection 16 is also in communication with part 13 of the three-way valve 12, 13, 14 by means of a pipe 24.

It will readily be understood that the gas pressure in the pipe or conduit 23, and therefore in the upper collector 4 and the tubes 2, can be regulated merely by opening and closing the valves 17 and 21. These valves may be opened and closed either manually or by the reactor control means (not shown). The gas or mixture of gases in the circuit that has just been described contains at least one neutron poison. Helium enriched with helium 3 may, for example, be used as well as other gases of high-neutron absorption cross section.

During the normal operation of the reactor, the liquid neutron poison is kept at the level 9. The gaseous neutron poison is in the tubes 2 in the core of the reactor above this level. Its pressure variations, effected by the circuit 16–23, vary the concentration of the poison and consequently the antireactivity introduced into the core of the reactor.

This enables the neutron flux in the core to be regulated in a much more simple manner than by conventional systems with solid control rods.

For the system according to the invention to function as a control rod, it is enough to close the valve 6 and open the ways 13, 14 of the valve 12, 13, 14, so that the pressure variations of the reactor-control gas leave the free level 9 of the liquid solution unchanged.

In the case of an alarm signal causing the way 12 to 14 to be opened and the way 13 to 14 to be closed, the pressurized driving gas issuing from the reservoir 15 forces the poison solution from the accumulator 7 into the tubes 2, the solution driving before it the gas or gases from the circuit 16–23.

In the system described with reference to FIG. 1 and in all the others coming within the scope of this invention, the driving force supplying the energy necessary for an emergency introduction of the poison solution into the core must always be enough for the solution to be able to drive the gaseous control atmosphere before it in the time required by the specifications, even when it reaches its maximum pressure, corresponding, for a given concentration of the absorbing or poison isotope, to the maximum antireactivity introduced into the core.

Once the concentration of the absorbing isotope has been fixed, the minimum pressure of the gaseous control atmosphere corresponding to the minimum antireactivity ("controls rods all withdrawn") introduced into the core, must always be greater than the vapor pressure of the liquid solution level with 9.

Figure 2:
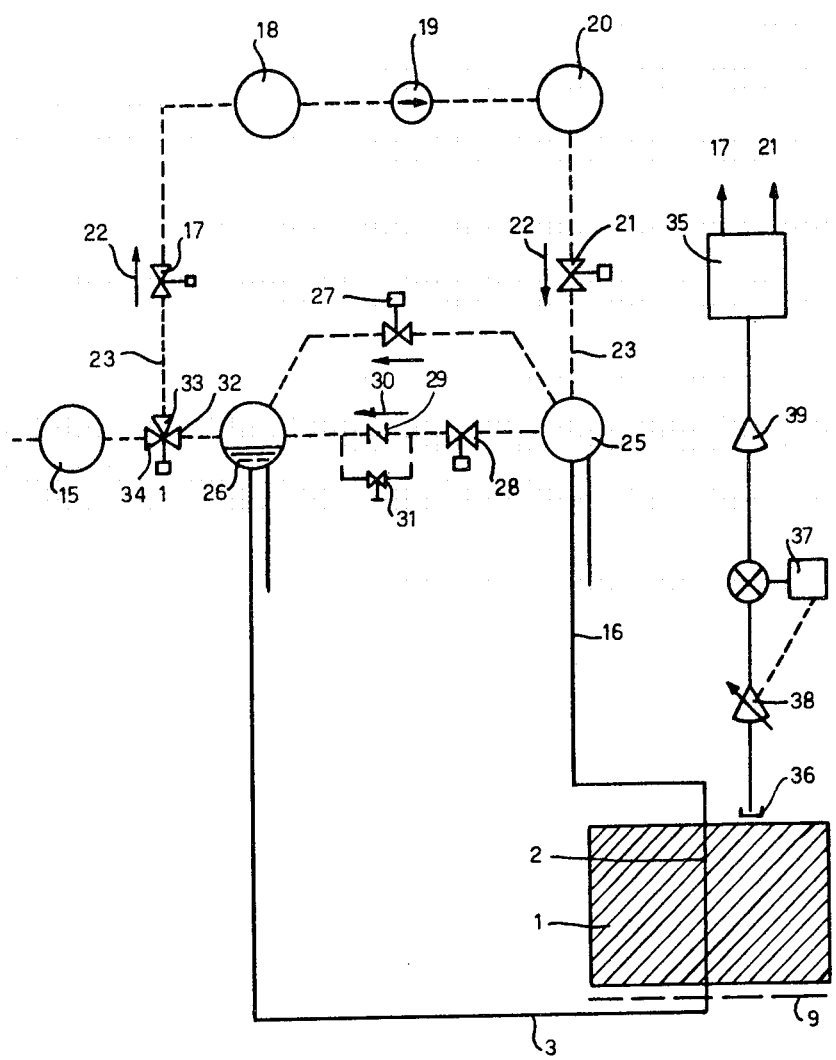
FIG. 2 shows a variation of the embodiment of FIG. 1.

In the system shown in FIG. 2, corresponding to Italian Pat. No. 800,930, the gas reservoir 25 is connected to the tops of the tubes 2. The poison-solution accumulator 26 is connected to it by two parallel ways, one having a valve 27 and the other having a valve 28 and a valve 29 of the nonreturn type only allowing the gas to pass in the direction indicated by the arrow 30. A branch of small cross section having a valve 31 is provided for the valve 29.

The reservoir 26 may be connected by means of the ways 32, 34 of the three-way valve 32, 33, 34 to a reservoir 15 for high-pressure driving gas similar to the reservoir 15 in FIG. 1. The reservoirs 25 and 26 together with the conduits and valves connecting them form part of the branch 23 of the circuit 17 to 23 for regulating the pressure of the gaseous control atmosphere, corresponding to the circuit 17–23 in FIG. 1. The branch 23 is interrupted by the reservoir 25 and by the ways 32, 33 of the valve 32, 33, 34, to permit the inclusion of the collection of elements described above.

During the normal operation of the reactor, the level 9 of the poison solution is maintained by means of a counter-pressure in the reservoir 25, and the pressure difference between the reservoirs 25 and 26 is controlled automatically by means of the valves 21 and 27.

In the case of an alarm signal, the valve 28 is opened, thus putting the reservoirs 25 and 26 at the same pressure and enabling the poison solution to rise in the rods. The reservoir 15 for pressure driving gas is only necessary if it is desired to increase the speed at which the solution is inserted in the core. It then suffices to open the ways 34, 32 of the valve 32, 33, 34 at the same time as the valve 28. The nonreturn valve 29 prevents the gas issuing from the reservoir 15 from flowing to the reservoir 25. The branch with the valve 31 enables the final level to be stabilized by a communicating-vessel effect after emergency introduction by means of the gas issuing from the reservoir 15.

FIG. 2 also shows a device 35 for opening the valves 17 and 21. The same device may also be used, of course, for the systems in the other figures. The device 35, or control device, may be actuated manually or controlled by the reactor-control system. A nonlimitative example of this control system is shown in FIG. 2. It comprises an ionization chamber 36, a system 37 for displaying the power $P_o$ and a unit for producing an error signal formed by a current amplifier 38 with automatic adaptation of the gain to the power applied and by a comparator amplifier 39.

Figure 3:
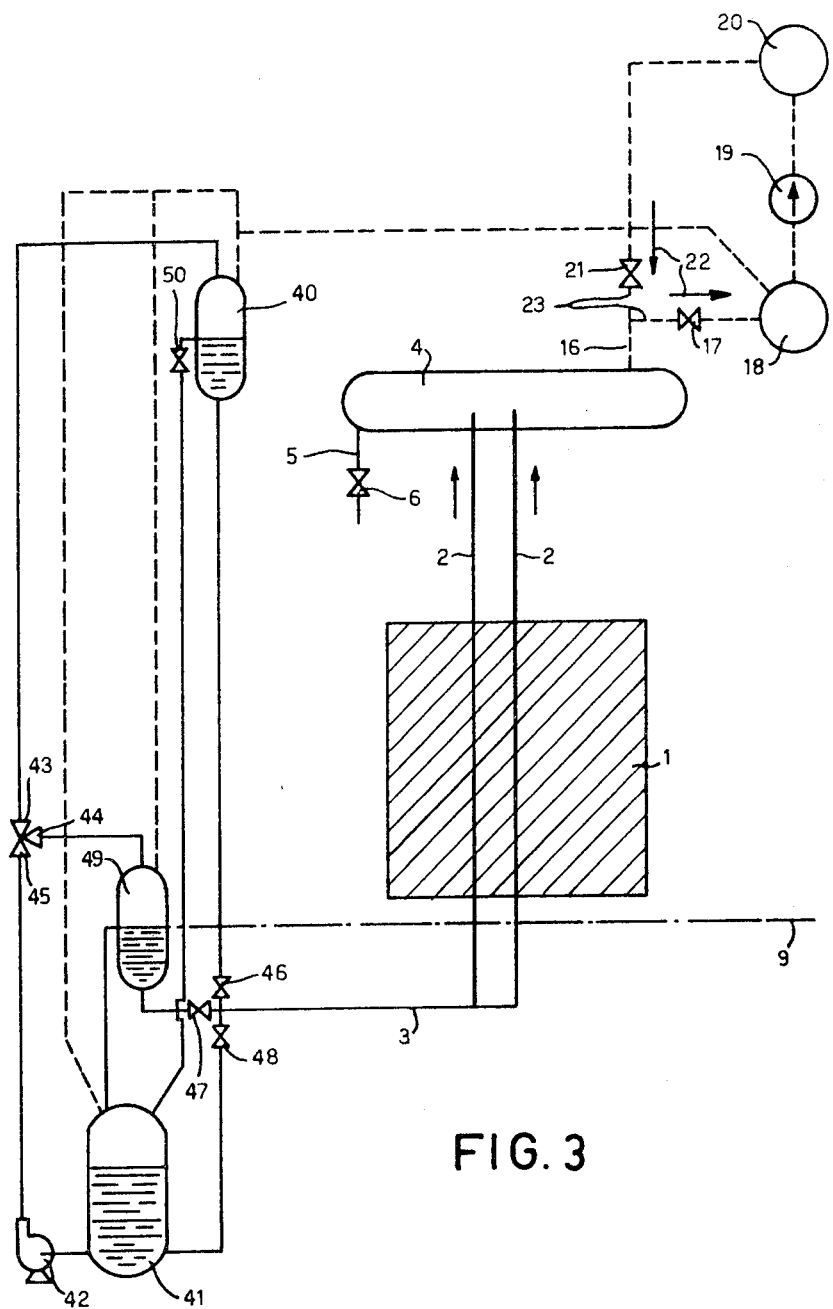
FIG. 3 shows another embodiment wherein gravity is employed as the driving force for the liquid solution in the safety rods.

The system shown in FIG. 3 uses gravity as a driving force for the liquid solution of the safety rods. As already explained in U.S. Application No. 768,637 previously mentioned, this system comprises receptacles 40, 41, 49, a pump 42, a three-way valve 43, 44, 45, and valves 46, 47, 48 and 50. In a manner similar to the bubbling-tube systems (FIG. 1) and counter-pressure systems (FIG. 2) a circuit of variable-pressure gas (gaseous control rods) 16–23 is connected to the tops of the hollow tubes 2. The atmospheres of the receptacles 40, 41 and 49 are directly connected to the low-pressure reservoir 18.

The operation of the system in FIG. 3 will easily be understood from the foregoing and from U.S. Application No. 768,637.

Figure 4:
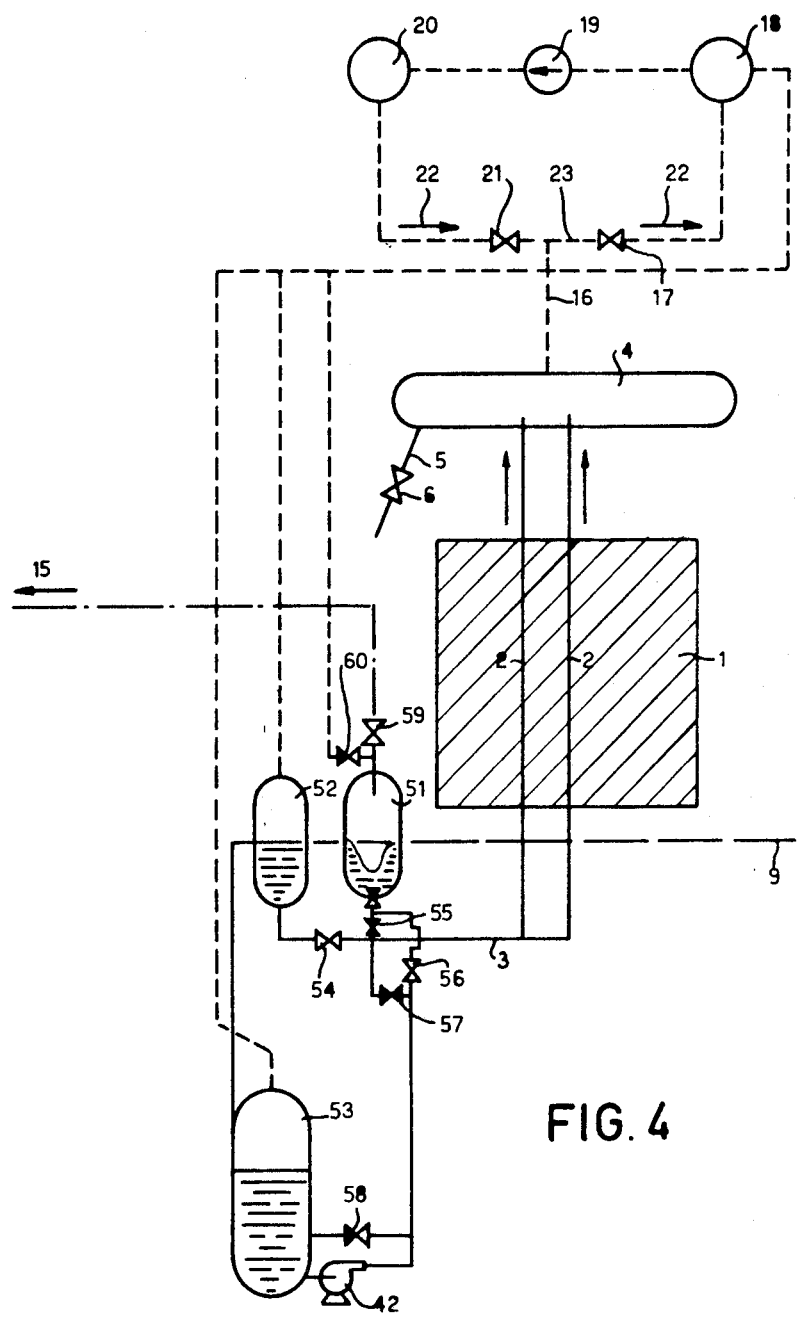
FIG. 4 shows still another embodiment using a diaphragm accumulator for drawing liquid solution into the hollow tubes.
Figure 5:
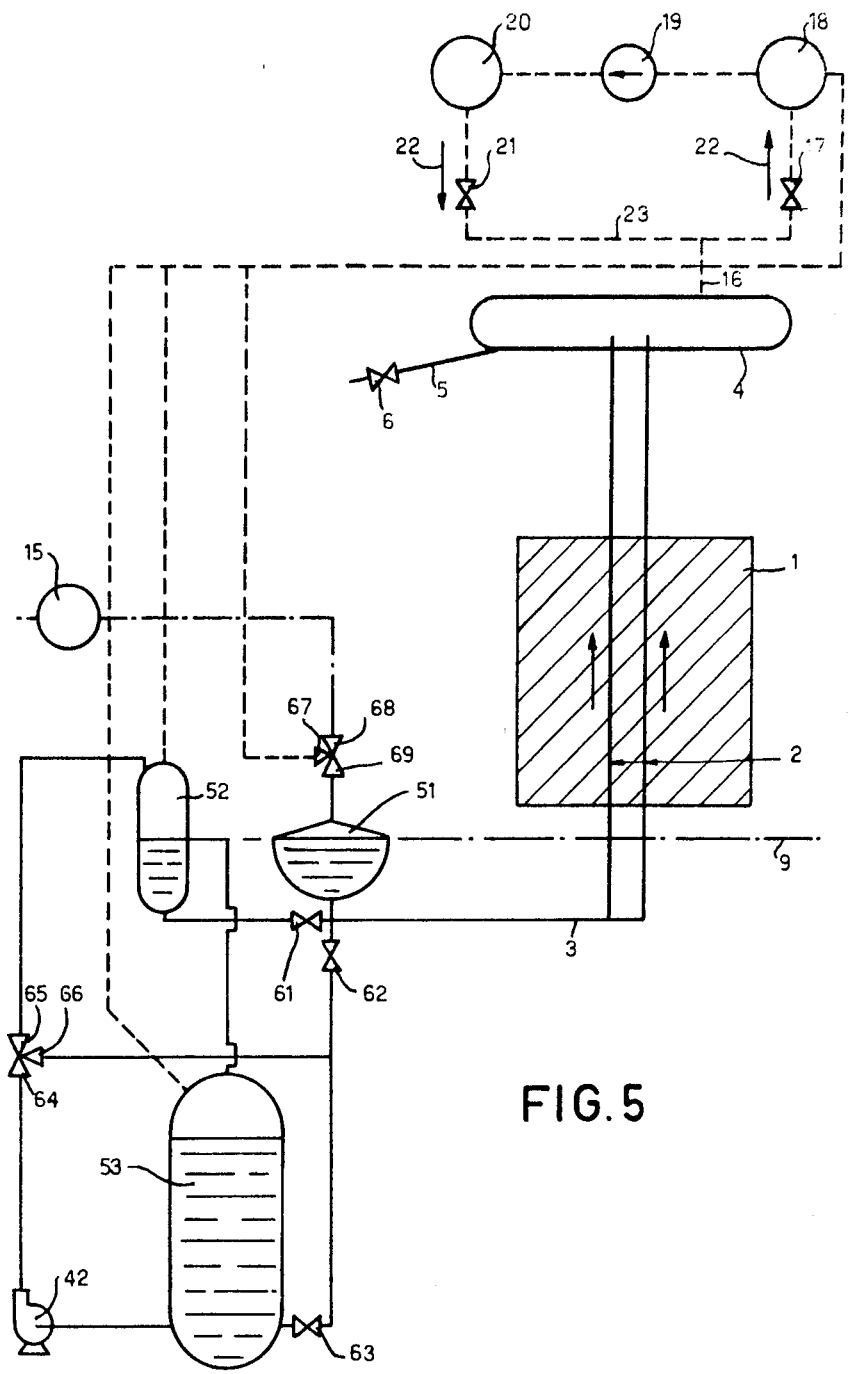
FIG. 5 shows a variation of the embodiment shown in FIG. 4.

The systems shown in FIGS. 4 and 5 use, in a manner similar to the systems in FIGS. 1 and 3 of U.S. Application No. 764,413 already mentioned, diaphragm accumulators for driving the liquid solution into the tubes 2 in the case of an alarm signal. In both cases, a circuit of variable-pressure gas (gaseous control rods) 16 to 23 is connected to the tops of the tubes 2.

The poison-solution circuit of the system in FIG. 4 comprises, in addition to the diaphragm accumulator 51, the reservoirs 52 and 53, and the valves 54, 55, 56, 57 and 58. The gaseous driving circuit has valves 59 and 60.

The poison-solution circuit in FIG. 5 comprises, in addition to the diaphragm accumulator 51 and the receptacles 52 and 53, the valves 61, 62, 63 and 64, 65, 66. The gaseous driving circuit comprises the three-way valve 67, 68, 69.

In both cases of systems with diaphragm accumulators, the different atmospheres of the receptacles containing the poison solution are connected directly to the low-pressure reservoir 18 and those of the accumulators by means of valves 60 (see FIG. 4) or 69, 67.

The operation of these systems will readily be understood from the foregoing and from U.S. Application No. 764,413.

The invention that has just been described is not limited to the embodiments that have just been presented. It includes, of course, all possible ways of distributing the tubes in different groups having one or several lower and/or upper collectors. It may be coupled with the use of circuits for washing the rods and for the circulation of the poison solution similar to those described in the documents cited above.

We claim:

1. In a nuclear reactor, a combined safety and control system, comprising at least one tube passing upwardly through the core of said reactor; means for providing a neutron absorbing gas of high-neutron absorption cross section in said tube; means for controlling the pressure of said gaseous atmosphere in order to control the reactivity in the core of said reactor; a neutron poison solution; means for maintaining said solution in an inoperative relationship with respect to said reactor core; and means for rapidly forcing said solution into said tube in the event of an emergency, thereby replacing said neutron absorbing gas therein; said last-mentioned means comprising a pressurized driving fluid and means for forcing said driving fluid into operative relationship with said neutron poison solution.

2. In the system of claim 1, said means for providing said neutron absorbing gas in said tube comprising a circuit of a gaseous atmosphere connected to the top of said tube, at least one of the components of said atmosphere being a neutron absorber; said means for controlling the pressure of said gaseous atmosphere including means for regulating the pressure thereof to values higher than the vapor pressure of said solution; said means for maintaining said solution in an inoperative relationship with respect to said reactor core comprising means for maintaining the free level of said solution just below the level of entry of said tube into said core regardless of the pressure in said tube; and said means for rapidly forcing said solution into said tube including means providing sufficient driving force to introduce said solution into said tube against the highest pressure of said gaseous atmosphere.

3. The system of claim 2, wherein said means for controlling the pressure of said atmosphere forms a closed circuit and comprises, in series, a first valve, a low-pressure reservoir, a compressor, a high-pressure reservoir, a second valve, and a conduit between said first and second valve, said compressor being adapted to transfer gas from said low-pressure reservoir to said high-pressure reservoir, and said tube being connected to said conduit between said two valves, so that gas pressure in said tube can be regulated by opening or closing said valves.

4. The system of claim 3, wherein said valves are opened and closed by a manually controlled device.

5. The system of claim 3, further including a reactor-control system, wherein said valves are opened and closed by said reactor-control system.

6. The system of claim 3, further comprising a penetrating-rod-type upper collector through which said tube is adapted to pass, an overflow pipe connected to said collector, and a leakproof valve on said overflow pipe, the atmosphere of said collector being connected to said closed circuit.

7. The system of claim 3, further comprising a reservoir for said solution; the atmosphere of said reservoir being connected to the low-pressure reservoir of said closed circuit.

8. The system of claim 3, further comprising a reservoir for said solution; the atmosphere of said solution reservoir being connected to said conduit of said closed circuit.

9. The system of claim 2, wherein said means for rapidly forcing said solution into said tube comprises a pressurized driving gas.

10. The system of claim 8, wherein a valve is interposed between said solution reservoir and said conduit, said valve being normally open but adapted to be closed therebetween in an emergency and to introduce said pressurized driving fluid into the atmosphere of said reservoir in order to drive said solution into said tube.

11. In a nuclear reactor, a method of providing safety and control, comprising the steps of introducing a neutron absorbing gas into at least one tube passing upwardly through the core of said reactor; regulating the pressure of said gas to control said reactor; maintaining a neutron poison solution in an inoperative relationship with respect to said tube through said reactor core; maintaining a pressurized driving fluid in potentially operative relationship with said poison solution; and rapidly introducing said solution into said tube in the event of an emergency by operatively connecting said driving fluid to said poison solution to provide a driving force therefor.

12. The method of claim 11, further comprising maintaining the free level of said neutron poison solution just below the level of entry of said tube into said core under normal operating conditions.

* * * * *